United States Patent [19]

Cordier et al.

[11] Patent Number: 5,256,383
[45] Date of Patent: Oct. 26, 1993

[54] PROCESS FOR THE SEPARATION OF ACTINIDES FROM LANTHANIDES BY THE SELECTIVE EXTRACTION OF THE ACTINIDES IN AN ORGANIC SOLVENT INCORPORATING A PROPANE DIAMIDE

[75] Inventors: Pierres-Yves Cordier; Christine Cuillierdier, both of Paris; Claude Musikas, Bures sur Yvette, all of France

[73] Assignee: Commissariat a l'Energie Atomique, Paris, France

[21] Appl. No.: 929,677

[22] Filed: Aug. 13, 1992

[30] Foreign Application Priority Data

Aug. 14, 1991 [FR] France .................. 91 10335

[51] Int. Cl.$^5$ ............................. B01D 11/00
[52] U.S. Cl. ............................. 423/9; 534/11
[58] Field of Search ............. 423/8, 2, 11, 9; 534/11

[56] References Cited

U.S. PATENT DOCUMENTS

| | | | |
|---|---|---|---|
| 3,276,849 | 9/1966 | Moore | 534/11 |
| 3,294,494 | 12/1966 | Moore | 534/11 |
| 4,461,747 | 7/1984 | Fitoussi et al. | 423/10 |
| 4,496,523 | 1/1985 | Bonnin et al. | 423/9 |
| 4,548,790 | 10/1985 | Horwitz et al. | 423/9 |
| 4,572,802 | 2/1986 | Hubert et al. | 423/9 |
| 4,574,072 | 2/1986 | Horwitz et al. | 423/9 |
| 4,770,807 | 3/1988 | Musikas et al. | 252/184 |
| 4,867,951 | 9/1989 | Smith et al. | 423/9 |
| 4,923,630 | 5/1990 | Smith et al. | 252/184 |
| 4,938,871 | 7/1990 | Musikas et al. | 210/634 |

FOREIGN PATENT DOCUMENTS

| | | |
|---|---|---|
| 210928 | 2/1987 | European Pat. Off. |
| 1466321 | 3/1967 | France |
| 2537326 | 3/1985 | France |
| 2585692 | 2/1987 | France |

OTHER PUBLICATIONS

J. Burg & Nuclear Chemistry 41(3), 391–395 (1979), Khopkar, P. K., "Extraction and Absorption Spectra . . . ".

Progress in Nuclear Energy "Process Chemistry", Series III, vol. 4, C. A. Stevenson, et al, pp. 596-598 (1970).

Muscatello et al, Separation Science and Technology, 17(6), pp. 859-875 (1982).

Khophar et al, Journal Inorganic Nuclear Chemistry, 34, pp. 2617-2678 (1972), "Extraction of Some Trivalent Lanthanides . . . ".

Gerontopulos, PTh., Radiochemica Acta, 42, pp. 75–78 (1965) "Separation of Americium (III) .. . ".

Leonard N. J. et al, Journal of American Chemical Society, 74, pp. 1704–1709 (1952) "Fate of an Eight--Membered Ring . .. ".

Cooper, F. C. et al, Journal of Chemical Society, pp. 459–464 (1950) "Antituberculous Compounds . . . ".

Primary Examiner—Donald P. Walsh
Assistant Examiner—Anthony R. Chi
Attorney, Agent, or Firm—Michael N. Meller

[57] ABSTRACT

The invention relates to a process for the separation of actinides from lanthanides by the selective extraction of the actinides in an organic solvent incorporating a propane diamide.

This process consists of adding to the aqueous nitric solution containing the actinides and lanthanides a thiocyanate, e.g. ammonium thiocyanate, followed by the contacting of said solution with an organic solvent incorporating at least one propane diamide, e.g. 2-tetradecyl-N,N'-dimethyl-N,N'-dibutyl-propane diamide and optionally a quaternary ammonium salt such as trilauryl methyl ammonium (TMA) thiocyanate or a mixture of quaternary ammonium thiocyanates.

This leads to distribution coefficients $D_M$ for the actinides (Am) and the lanthanides (Eu, Ce) making it possible to achieve high actinide/lanthanide separation factors.

14 Claims, 1 Drawing Sheet

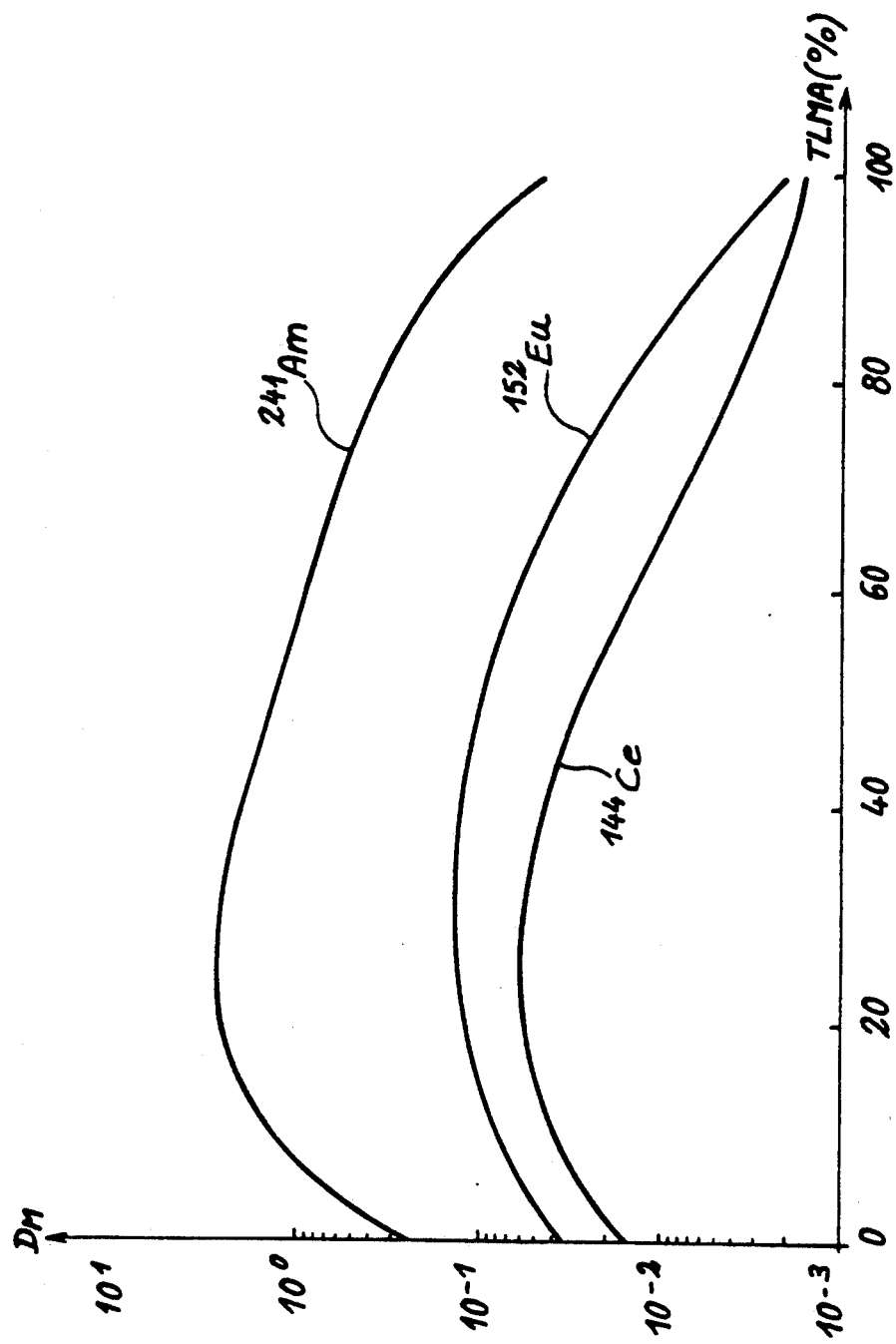

PROCESS FOR THE SEPARATION OF ACTINIDES FROM LANTHANIDES BY THE SELECTIVE EXTRACTION OF THE ACTINIDES IN AN ORGANIC SOLVENT INCORPORATING A PROPANE DIAMIDE

BACKGROUND OF THE INVENTION

The present invention relates to a process for the separation of actinides from lanthanides present in the trivalent state in an aqueous nitric solution. More specifically, it relates to the selective extraction of actinides in an organic solvent containing a propane diamide.

In irradiated nuclear fuel reprocessing installations, in the first extraction stage of uranium and plutonium, aqueous solutions are obtained of fission products containing relatively large quantities of trivalent ions from the series of lanthanides and actinides. The aqueous effluents from these installations also contain the same ions.

In view of the relatively long period of actinide elements, it is of great interest to separate them from nitric aqueous solutions in order to avoid the manipulation of waste or effluents having a high alpha activity. Thus, the presence of alpha emitters with a long life such as Pu, Am, Np and Cm leads to high waste storage costs.

The presently known processes for the extraction of the actinides present in such solutions, e.g. the processes described in FR-A-2 537 326 and FR-A-2 585 692, make it possible to extract the actinides in an organic solvent, no matter what their valency state, but with these processes the trivalent lanthanides resulting from the fission products are also extracted in the organic solvent.

Thus, the ions of series 4f and 5f in the trivalent state have identical chemical properties making their separation especially difficult. However, in order to further improve the control of waste materials, it would be of interest to separate the actinides from the lanthanides.

Progress in Nuclear Energy, Series III, Process Chemistry, vol. 4, C. E. Stevenson, E. A. Mason and T. Gresky, Pergamon Press, pp 596-598 describes a process making it possible to separate actinides from lanthanides present in an aqueous solution and which uses highly concentrated complexing solutions.

Consideration has also been given to the separation of actinides from lanthanides by the selective extraction of the actinides by means of an organic extractant of the phosphonate type diluted in para-diisopropyl benzene, by adding a thiocyanate to an aqueous hydrochloric solution containing lanthanides and actinides, with a view to aiding said separation and as is described by Muscatello et al in Separation Science and Technology, 17(6), pp 859–875, 1982.

However, when it is wished to use the same separating principle with other neutral extractants such as tributyl phosphate or trioctyl phosphine oxide, a satisfactory result is not obtained, as is described by Khopkar et al in J. Inorg. Nucl. Chem., 34, pp 2617–2625, 1972.

However, it is possible to use this extraction principle with anionic extractants such as quaternary ammonium salts, as is described by Gerontopoulos et al in Radiochimica Acta, 4.2, pp 75–78, 1965.

SUMMARY OF THE INVENTION

The present invention specifically relates to a process for the separation of actinides from the lanthanides present in a nitric aqueous solution making it possible to selectively extract the actinides in an organic solvent, by using a neutral organic extractant and which is more interesting than phosphonates.

DETAILED DESCRIPTION OF THE INVENTION

The invention therefore relates to a process for the separation of the actinides from the lanthanides present in an aqueous nitric solution consisting of adding to the aqueous nitric solution a thiocyanate and then contacting the aqueous solution containing the thiocyanate with an immiscible organic solvent incorporating at least one propane diamide of formula:

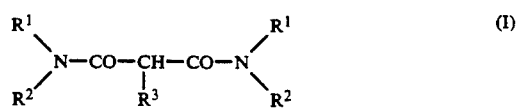

in which $R^1$ and $R^2$, which can be the same or different, represent a straight or branched-chain alkyl radical having 1 to 15 carbon atoms or a radical of formula:

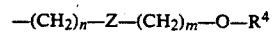

in which $R^4$ is an alkyl radical with 1 to 6 carbon atoms, n is equal to 0 or is an integer from 1 to 6, Z is a single bond or an oxygen atom and m is an integer from 1 to 6, provided that Z is a single bond when n is equal to 0 and $R^3$ represents a hydrogen atom, an alkyl radical having 1 to 25 carbon atoms or a radical of formula:

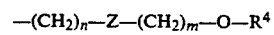

in which n, m, Z and $R^4$ have the meanings given hereinbefore, for the selective extraction of the actinides in an organic solvent.

In this process, the addition of thiocyanate to the aqueous solution enables the diamide of formula (I), which is a neutral extractant, to extract the metallic species present in the aqueous solution in the form of neutral complexes of formula $M(SCN)_3$, in which M is the extracted metallic species. In view of the fact that the thiocyanate is a "soft" ligand, which preferably complexes the 5f ions, the diamide extracts in preferred manner the 5f ions, i.e. the actinides, and thus separates them from the lanthanides.

The thiocyanate added to the aqueous phase is a thiocyanic acid salt, whose cation can easily be exchanged by the actinides to be extracted.

As examples of usable thiocyanates, reference can be made to ammonium thiocyanate and alkali metal thiocyanates such as sodium or potassium. The thiocyanate quantity added is in particular dependent on the actinide quantities to be extracted. Generally the thiocyanate concentration of the aqueous solution is 0.01 to 2 mole/l.

In this process, the use of thiocyanate with a propane diamide is of particular interest, because propane diamides have the advantage of being incineratable, of not giving harmful degradation products and of being easy to synthesize and purify, which is very advantageous for a use in an active medium.

Moreover, with propane diamide, in a thiocyanate medium, high separation coefficients are obtained between the actinides and the lanthanides.

For performing the process according to the invention, it is possible to use various propane diamides of formula (I). However, preference is generally given to the use of a propane diamide of formula (I), in which $R^1$ and $R^2$, which can be the same or different, are alkyl radicals, preferably having 1 to 4 carbon atoms, and $R^3$ is an alkyl radical or the radical of formula $$-(CH_2)_n-Z-(CH_2)_m-O-R^4,$$

preferably an alkyl radical with 12 to 25 carbon atoms, because the use of such substituents permits the use of aliphatic diluents.

As examples of propane diamides which can be used, reference is made to that complying with the formula:

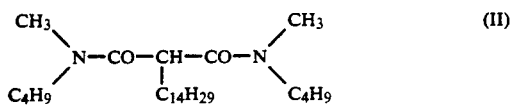

The propane diamides of formula (I) can be prepared by conventional processes, particularly as described in FR-A-2 585 700.

Thus, it is possible to prepare them from tetrasubstituted propane diamides of formula:

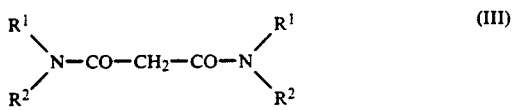

in which $R^1$ and $R^2$ have the meanings given hereinbefore, by reaction with n-butyl lithium followed by a condensation with a halide of formula $R^3X$, in which X represents a halogen atom.

The halides of formula $R^3X$ are preferably bromides or iodides and can be prepared when $R^3$ incorporates an ether-oxide group, by using the process described by F. C. Cooper and M. W. Partridge in J. Chem. Soc., 1950, p 459.

The tetrasubstituted propane diamides used as starting products can be prepared by the amination of malonyl chloride by means of corresponding amines of formula:

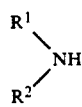

in which $R^1$ and $R^2$ have the meanings given hereinbefore.

The amines $HNR^1R^2$ can be prepared by conventional processes, particularly that described by J. L. Nelson and R. C. Sentz in J. Amer. Chem. Soc., vol. 74, p 1704, 1952.

When the processes described hereinbefore are used for the preparation of the propane diamides used in the invention, the propane diamide obtained is constituted by a mixture of isomers.

According to the invention, it is possible to use as the extracting agent one of the said isomers or a mixture thereof, and it is pointed out that the formulas given here can represent either one of the isomers or the mixture of the isomers.

The organic solvent used in the invention generally comprises, apart from the extracting agent constituted by at least one propane diamide of formula (I), an organic diluent which can be chosen from among aliphatic diluents such as dodecane, hydrogen tetrapropylene, cyclic diluent such as decalin, aromatic diluents such as benzene, xylene, mesitylene, tert. butyl benzene and chlorinated diluents such as tetrachloroethylene.

Preference is given to the use of an aliphatic diluent such as hydrogen tetrapropylene. In this organic solvent, the propane diamide concentration is chosen as a function of the content of actinides in the aqueous solution in order to obtain a good actinide extraction level. Generally, the propane diamide concentration is 0.1 to 2 mole/l.

However, although the actinide extraction level increases with the propane diamide concentration of the organic solvent, preference is given to the use of propane diamide concentrations not exceeding 1 mole/l in order to obtain a good separation of the actinides and the lanthanides.

In the process according to the invention, the nitric acid concentration of the starting aqueous solution also exerts an influence on the separation level. Preferably, the nitric acid concentration is equal to or below 0.5 mole/l, e.g. 0.001 to 0.35 mole/l.

According to a preferred embodiment of the process according to the invention, the organic solvent also incorporates a quaternary ammonium thiocyanate or a quaternary ammonium thiocyanate mixture which is commercially available.

Thus, by a synergistic effect, the presence of such a salt makes it possible to improve the actinide extraction level, whilst retaining the separation effect created by the complexing difference of the thiocyanates, by carrying out an extraction of anionic complexes by means of the propane diamide-ammonium salt system.

The quaternary ammonium thiocyanate or thiocyanates used comply e.g. with the formula:

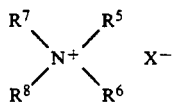

in which $R^5$, $R^6$, $R^7$ and $R^8$, which can be the same or different, are alkyl radicals with 1 to 25 carbon atoms and $X^-$ is the anion $SCN^-$. Preferably, the salt is trilauryl methyl ammonium thiocyanate.

It is also possible to prepare the organic solvent containing the thiocyanate by starting with other quaternary ammonium salts, e.g. a halide such as chloride or nitrate, which are readily soluble like propane diamides in organic diluents such as benzene and heavy alcohols. Thus, by then contacting the organic solvent and an aqueous solution containing the thiocyanate, the anions such as the chloride, starting quaternary ammonium salt is exchanged with the thiocyanate ion of the aqueous solution, which is much more lipophilic.

It is also possible to directly introduce the quaternary ammonium salt in thiocyanate form, e.g. by starting with the quaternary ammonium chloride in a volatile diluent such as methylene chloride, which is contacted with a concentrated ammonium thiocyanate solution to then obtain by evaporation of the diluent, quaternary ammonium thiocyanate, which can be redissolved in the organic diluent used in the organic solvent according to the invention and even in a diluent such as hydrogen tetrapropylene (HTP).

Advantageously the quaternary ammonium salt concentration of the organic solvent is 0.1 to 0.5 mole/l.

In order to obtain better results, the propane diamide and ammonium salt concentrations are chosen such that the molar ratio of the ammonium salt to the diamide is 0.05 to 0.6.

In this preferred embodiment of the process according to the invention, it is assumed that the extraction of the actinides corresponds to the following reaction diagram:

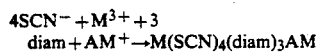

in which diam represents the propane diamide and AM+ the quaternary ammonium.

Thus, as a result of the combined effect of the different ligands $SCN^-$, $AM^+$ and diam, it is possible to improve the extraction of the actinides and their separation from the lanthanides, as will be shown hereinafter.

Before being used for the selective extraction of actinides, the organic extraction solvent used in the invention is contacted with an aqueous nitric acid solution and thiocyanic acid having respective nitric acid and thiocyanic acid concentrations identical to those of the aqueous solution containing the actinides to be separated.

This contacting makes it possible to pre-balance the organic solvent in order to prevent any subsequent variation of the $SCN^-$ and $NO_3^-$ concentration of the solvent, because the propane diamides are in fact liable to extract the thiocyanic acid and the nitric acid. The contacting operation is repeated three times.

The process according to the invention can be performed in any conventional extraction equipment such as banks of mixer-settlers, exchange columns, e.g. pulsed columns, centrifugal extractors, etc.

Generally, working takes place at ambient temperature and pressure with volume ratios between the aqueous solution and the organic solvent between 0.1 and 10.

The actinides selectively extracted in the organic solvent can then be recovered with very good yields by reextraction in a highly diluted aqueous nitric phase ($5.10^{-3}M$).

Other features and advantages of the invention can be gathered from the study of the following illustrative and non-limitative examples.

DESCRIPTION OF THE DRAWING

The attached drawing is a graph showing the variations of the distribution coefficients of americium $D_{AM}$, europium $D_{Eu}$ and cerium $D_{Ce}$, as a function of the quaternary ammonium salt concentration of the organic solvent used for the extraction.

EXAMPLE 1

Selective extraction of americium by 2-tetradecyl-N,N'-dimethyl-N,N'-dibutyl-propane diamide a) Preparation of 2-tetradecyl-N,N'-dimethyl-N,N'-dibutyl-propane diamide of formula:

$$\begin{array}{c} CH_3 \\ \diagdown \\ C_4H_9 \end{array} N-CO-CH-CO-N \begin{array}{c} CH_3 \\ \diagup \\ C_4H_9 \end{array} \quad (II)$$
$$\qquad\qquad\qquad | \\ \qquad\qquad\quad C_{14}H_{29}$$

Into a 1 liter reactor scavenged by an argon flow is introduced 0.1 mole of N,N'-dimethyl-N,N'-dibutyl-propane diamide dissolved in 400 ml of tetrahydrofuran. Cooling takes place to $-50°$ C. with the aid of an acetone bath and solid carbon dioxide and a solution of N-butyl lithium prepared from 0.1 mole of N-butyl lithium is poured into 100 ml of tetrahydrofuran. Under the same conditions, a tetradecyl iodide solution prepared from 0.1 mole of tetradecyl iodide and 100 ml of anhydrous tetrahydrofuran is poured. When pouring is at an end, the temperature is allowed to rise to ambient temperature, followed by heating the tetrahydrofuran to reflux for 3 h. This is followed by cooling and hydrolyzing with a water-ethanol mixture. The tetrahydrofuran is expelled and in this way a precipitate is formed. The methylene chloride is taken up, washed with water, the organic layer dried and then the solvent is expelled prior to distillation.

Its characterization by nuclear magnetic resonance of the proton and by potentiometric assay confirms that it is in accordance with the formula given hereinbefore.

b) Selective extraction of americium

Use is made of a starting aqueous nitric solution with a nitric acid concentration of 0.001 mole/l and which contains traces of the following radioelements: $^{241}Am$ and $^{152}Eu$.

According to the invention, addition firstly takes place to said aqueous solution of ammonium thiocyanate so as to have an ammonium thiocyanate concentration of 0.01 mole/l.

Preparation also takes place of an organic solvent by dissolving 0.477 mole/l of propane diamide according to formula (II) prepared herein-before in hydrogen tetrapropylene, after which the organic solvent undergoes a pre-balancing by contacting it with an aqueous solution containing 0.001 mole/l of nitric acid and 0.01 mole/l of ammonium thiocyanate and this operation is repeated three times.

Contacting takes place between one volume of organic solvent and one volume of aqueous solution, accompanied by stirring, during five minutes and with vortex, followed by the separation of the two phases by centrifuging. Their $^{241}Am$ and $^{152}Eu$ contents are then measured by gamma spectrometry and the distribution coefficients $D_{Am}$ and $D_{Eu}$ are determined, which correspond to the ratio of the concentration of the radioelement (Am or Eu) in the organic solvent on the concentration of said same element (Am or Eu) in the aqueous solution

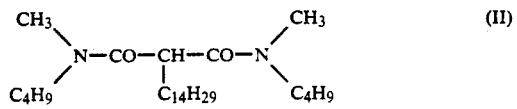

There is also a determination of the separation factor $F_s(Am/Eu)$, which corresponds to the ratio $D_{Am}/D_{Eu}$.

The results obtained are given in table 1.

EXAMPLES 2 TO 15

The operating procedure of example 1 is followed for the selective extraction of americium from an aqueous nitric solution containing $^{241}Am$, $^{152}Eu$ and possibly $^{144}Ce$, using the propane diamide of example 1 in hydrogen tetrapropylene with the concentrations of propane diamide, nitric acid and ammonium thiocyanate given in table 1.

The results obtained, i.e. the distribution coefficients $D_{Am}$, $D_{Eu}$ and $D_{Ce}$, as well as the separation factors $F_s(Am/Eu)$ and $F_s(Am/Ce)$ are also given in table 1.

On the basis of these results, it is clear that it is possible to achieve separation factors up to 7, associated with distribution coefficients usable in mixer-settlers, whilst using an aliphatic diluent currently employed in the nuclear industry. This confirms the interest of the process according to the invention.

EXAMPLE 16

This example uses an organic solvent constituted by benzene containing 0.25 mole/l of diamide of formula (II) of example 1 for the selective extraction of americium from an aqueous nitric solution having a nitric acid concentration of 0.07 mole/l and to which is added 0.1 mole/l of ammonium thiocyanate.

As in example 1, contacting firstly takes place between the organic solvent and an aqueous solution containing 0.07 mole/l of nitric acid and 0.1 mole/l of ammonium thiocyanate in order to pre-balance the solvent before using it for extraction and this operation is repeated three times.

Then contacting takes place between one volume of the organic solvent, which has been pre-balanced, and one volume of aqueous solution at ambient temperature, accompanied by stirring and for 5 minutes with a vortex, followed by the separation of the two phases by centrifuging and the distribution coefficients of each radioelement ($D_{Am}$, $D_{Eu}$ and $D_{Ce}$) are determined, together with the separation factors $F_s(Am/Eu)$ and $F_s(Am/Ce)$, as in example 1.

The results obtained are given in table 2.

EXAMPLES 17 TO 24

The operating procedure of example 16 is followed for the selective extraction of americium from an aqueous solution containing traces of $^{241}Am$, $^{152}Eu$ and $^{144}Ce$ and having the same nitric acid and thiocyanic acid concentrations as the aqueous solution of example 16, but the organic solvent used is benzene containing the propane diamide of formula (II) of example 1 and trilauryl methyl ammonium chloride (TLMA) with a total concentration of said two extractants of 0.25 mole/l and the molar trilauryl methyl ammonium chloride percentage given in table 2.

As previously, the distribution coefficients and separation factors obtained under these conditions are determined and the results are given in table 2. On the basis of these results, it can be seen that there is a significant improvement to the americium/europium and americium/cerium separation factors.

These results are also given in FIG. 1, which is a graph showing the evolution of the different distribution coefficients $D_M$ of $^{241}Am$, $^{152}Eu$ and $^{144}Ce$, as a function of the molar trilauryl methyl ammonium (TLMA) percentage.

The characteristic shape of the curves obtained reveals the synergism between the two extractants.

EXAMPLE 25

In this example use is made of an organic solvent incorporating the propane diamide of example 1 and trilauryl methyl ammonium thiocyanate.

In order to obtain this solvent, the starting product is trilauryl methyl ammonium chloride, which is dissolved in a volatile organic diluent, such as methylene chloride, followed by the contacting of said TLMA chloride with a concentrated ammonium thiocyanate solution in order to bring about the $CL^-/SCN^-$ exchange and then the organic diluent is evaporated. It is then possible to dissolve this product in the HTP-diamide mixture, so as to give an organic solvent containing 0.5 mole/l of propane diamide of example 1 and 0.2 mole/l of trilauryl methyl ammonium salt dissolved in hydrogen tetrapropylene.

After pre-balancing this solvent three times with an aqueous solution containing 0.07 mole/l of nitric acid and 0.1 mole/l of ammonium thiocyanate, the latter is contacted with an aqueous solution of 0.07 mole/l nitric acid and 0.1 mole/l ammonium thiocyanate, containing traces of americium, europium and cerium, for 5 min, accompanied by stirring and with vortex, followed by the separation of the phases by centrifuging and the determination of the distribution coefficients of the elements Am, Eu and Ce, as well as the Am/Eu and Am/Ce separation factors by gamma spectrometry.

The results obtained are given in table 3.

EXAMPLE 26

This example follows the same operating procedure as in example 25, but using the same concentration (0.25 mole/l) of diamide and trilauryl methyl ammonium chloride in the hydrogen tetrapropylene.

The results obtained are also given in table 3.

On the basis of these results, it can be seen that the use of 0.25 mole/l of propane diamide and 0.25 mole/l of trilauryl methyl ammonium chloride makes it possible to obtain very high separation factors.

TABLE 1

|  | ex 1 | ex 2 | ex 3 | ex 4 | ex 5 | ex 6 | ex 7 | ex 8 | ex 9 | ex 10 | ex 11 | ex 12 | ex 13 | ex 14 | ex 15 |
|---|---|---|---|---|---|---|---|---|---|---|---|---|---|---|---|
| Propane diamide of formula (II) (mole/l) | 0.477 | 0.477 | 0.477 | 0.477 | 0.477 | 0.477 | 0.477 | 0.477 | 0.477 | 0.245 | 0.245 | 0.245 | 0.245 | 0.245 | 0.245 |
| $HNO_3$ (mole/l) | 0.001 | 0.001 | 0.001 | 0.001 | 0.13 | 0.13 | 0.13 | 0.13 | 0.13 | 0.33 | 0.33 | 0.33 | 0.33 | 0.33 | 0.33 |
| $NH_4SCN$ (mole/l) | 0.01 | 0.05 | 0.1 | 0.5 | 0.01 | 0.04 | 0.08 | 0.1 | 0.15 | 0.1 | 0.2 | 0.25 | 0.3 | 0.35 | 0.40 |
| $D_{Am}$ | 0.13 | 9.30 | 41.3 | 101 | 0.037 | 2.23 | 16.55 | 28.44 | 54.9 | 0.3 | 10.22 | 13.30 | 43.50 | 55.5 | 157.31 |
| $D_{Eu}$ | 0.021 | 1.54 | 7.46 | 127 | 0.008 | 0.34 | 2.81 | 5.08 | 18.8 | 0.05 | 1.77 | 2.58 | 9.30 | 13.01 | 24.07 |
| $F_s$ | 6.2 | 6.1 | 5.5 | 0.8 | 4.8 | 6.5 | 5.9 | 5.6 | 2.9 |  |  |  |  |  |  |
| $D_{Ce}$ |  |  |  |  |  |  |  |  |  |  | 1.74 | 3.94 | 14.18 | 22.34 | 35.65 |
| $F_s Am/Eu$ |  |  |  |  |  |  |  |  |  | 6.1 | 5.8 | 5.1 | 4.7 | 4.3 | 6.5 |
| $F_s Am/Ce$ |  |  |  |  |  |  |  |  |  |  | 5.9 | 3.4 | 3.1 | 2.5 | 4.4 |

TABLE 2

|  | ex 16 | ex 17 | ex 18 | ex 19 | ex 20 | ex 21 | ex 22 | ex 23 | ex 24 |
|---|---|---|---|---|---|---|---|---|---|
| TLMA (molar %) | 0 | 10 | 15 | 25 | 30 | 40 | 60 | 80 | 100 |
| $D_{Am}$ | 0.22 | 1.63 | 2.07 | 2.36 | 2.31 | 2.24 | 0.98 | 0.33 | 0.046 |
| $D_{Eu}$ | 0.032 | 0.093 | 0.10 | 0.12 | 0.12 | 0.13 | 0.074 | 0.015 | 0.002 |
| $D_{Ce}$ | 0.016 | 0.039 | 0.047 | 0.064 | 0.045 | 0.052 | 0.024 | 0.044 | — |
| $F_s$ (Am/Eu) | 6.8 | 17.6 | 20.5 | 19.7 | 18.5 | 17.8 | 13.3 | 22.2 | 1.9 |
| $F_s$ (Am/Ce) | 13.2 | 41.8 | 44.1 | 36.9 | 48.9 | 43.3 | 41.2 | 73.8 |  |

TABLE 3

|  | ex 25 | ex 26 |
| --- | --- | --- |
| Diamide of example 1 (mole/l) | 0.5 M | 0.25 M |
| TLMA (mole/l) | 0.20 M | 0.25 M |
| HNO$_3$ (mole/l) | 0.07 | 0.07 |
| NH$_4$SCN (mole/l) | 0.1 | 0.1 |
| D$_{Am}$ | 6.26 | 12.00 |
| D$_{Eu}$ | 3.09 | 0.76 |
| D$_{Ce}$ | 1.84 | 0.36 |
| F$_s$Am/Eu | 2.0 | 15.8 |
| F$_s$Am/Ce | 3.4 | 33.2 |

We claim:

1. Process for the separation of the actinides from the lanthanides present in an aqueous nitric solution consisting of adding to the aqueous nitric solution a thiocyanate and then contacting the aqueous solution containing the thiocyanate with an immiscible organic solvent incorporating at least one propane diamide of formula:

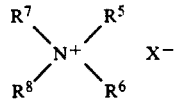
(I)

in which R$^1$ and R$^2$, which can be the same or different, represents a straight or branched-chain alkyl radical having 1 to 15 carbon atoms or a radical of formula:

$$-(CH_2)_n-Z-(CH_2)_m-O-R^4$$

in which R$^4$ is an alkyl radical with 1 to 6 carbon atoms, n is equal to 0 or is an integer from 1 to 6, Z is a single bond or an oxygen atom and m is an integer from 1 to 6, provided that Z is a single bond when n is equal to 0 and R$^3$ represents a hydrogen atom, an alkyl radical having 1 to 25 carbon atoms or a radical of formula:

$$-(CH_2)_n-Z-(CH_2)_m-O-R^4$$

in which n, m, Z and R$^4$ have the meanings given hereinbefore, for the selective extraction of the actinides in an organic solvent.

2. Process according to claim 1, characterized in that the thiocyanate is an ammonium or alkali metal thiocyanate.

3. Process according to claim 1, characterized in that the thiocyanate concentration of the aqueous solution is 0.01 to 2 mole/l.

4. Process according to claim 1, characterized in that, in formula (I), R$^1$ and R$^2$, which can be the same or different, are C$_1$ to C$_4$ alkyl radicals and R$^3$ is a C$_{12}$ to C$_{25}$ alkyl radical.

5. Process according to claim 4, characterized in that the diamide complies with the formula:

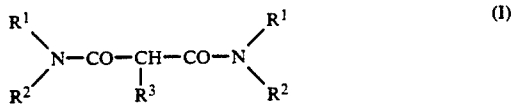

6. Process according to claim 1, characterized in that the organic solvent comprises an organic diluent chosen from among aliphatic diluents, aromatic diluents and chlorinated diluents.

7. Process according to claim 6, characterized in that the organic diluent is hydrogen tetrapropylene.

8. Process according to claim 1, characterized in that the diamide concentration of the organic solvent is 0.1 to 2 mole/l.

9. Process according to claim 1, characterized in that the nitric acid concentration of the aqueous solution is 0.001 to 0.5 mole/l.

10. Process according to claim 1, characterized in that the organic solvent also comprises a quaternary ammonium thiocyanate or a quaternary ammonium thiocyanate mixture.

11. Process according to claim 10, characterized in that the quaternary ammonium thiocyanates comply with the formula:

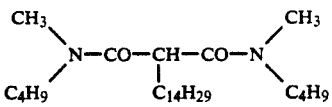

in which R$^5$, R$^6$, R$^7$ and R$^8$, which can be the same or different, are alkyl radicals with 1 to 25 carbon atoms and X$^-$ is the anion SCN$^-$.

12. Process according to claim 11, characterized in that the thiocyanate is trilauryl methyl ammonium thiocyanate.

13. Process according to claim 10, characterized in that the quaternary ammonium thiocyanate concentration of the organic solvent is 0.1 to 0.5 mole/l.

14. Process according to claim 10, characterized in that the molar ratio of the quaternary ammonium thiocyanate to the diamide is 0.05 to 0.6.

* * * * *